US006892518B1

United States Patent
Bares

(10) Patent No.: US 6,892,518 B1
(45) Date of Patent: May 17, 2005

(54) EDGE TRIMMER ASSEMBLY MOUNTABLE ON A LAWN MOWER

(76) Inventor: Michael Bares, 2630 Germain Rd., Abbeville, LA (US) 70510

( * ) Notice: Subject to any disclaimer, the term of this patent is extended or adjusted under 35 U.S.C. 154(b) by 0 days.

(21) Appl. No.: 10/713,925

(22) Filed: Nov. 14, 2003

(51) Int. Cl.$^7$ .............................................. A01D 34/84
(52) U.S. Cl. ........................................ 56/12.7; 56/10.4
(58) Field of Search ................................ 56/12.7, 13.7, 56/10.4

(56) References Cited

U.S. PATENT DOCUMENTS

| | | | | |
|---|---|---|---|---|
| 4,104,851 A | * | 8/1978 | Perry | 56/10.4 |
| 4,802,327 A | * | 2/1989 | Roberts | 56/15.2 |
| 5,167,108 A | * | 12/1992 | Bird | 56/13.7 |
| 5,966,914 A | * | 10/1999 | Reents | 56/16.7 |

\* cited by examiner

Primary Examiner—Meredith Petravick
(74) Attorney, Agent, or Firm—Keaty Professional Law Corporation

(57) ABSTRACT

A trimmer assembly for a lawn mower is detachably mountable on a deck of the lawn mower by a housing or shroud that can be secured to the front edge of the deck A mounting frame is pivotally attached to the housing. The mounting frame carries a trimmer head with a plurality of cutting elements secured thereto. The mounting frame and the trimmer head pivotally move between an operational and a non-operational position by a swivel arm secured to the mounting frame. A proximate end of the swivel arm engages a handle, which is secured to the housing. The handle has a limited rotation for pivotally moving the mounting frame. A stop plate mounted below the handle limits the pivotal movement of the handle in relation to the housing. The trimmer head may by powered by a belt connected to a drive pulley of the lawn mower, by an electric motor, a hydraulic motor or other suitable power source.

5 Claims, 4 Drawing Sheets

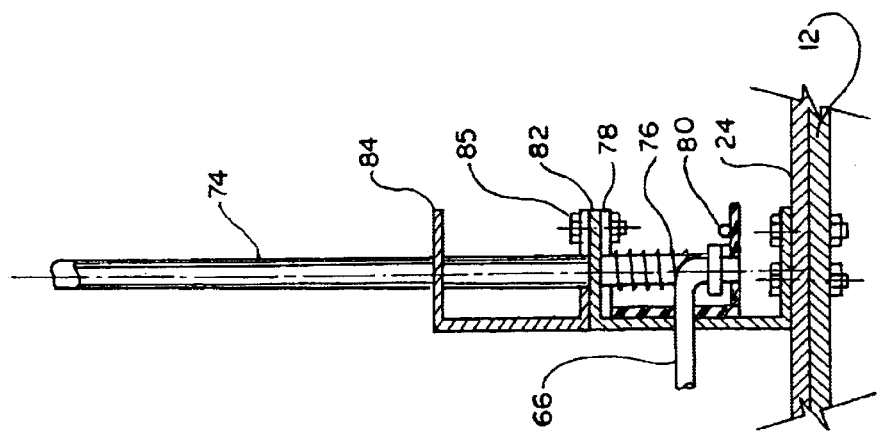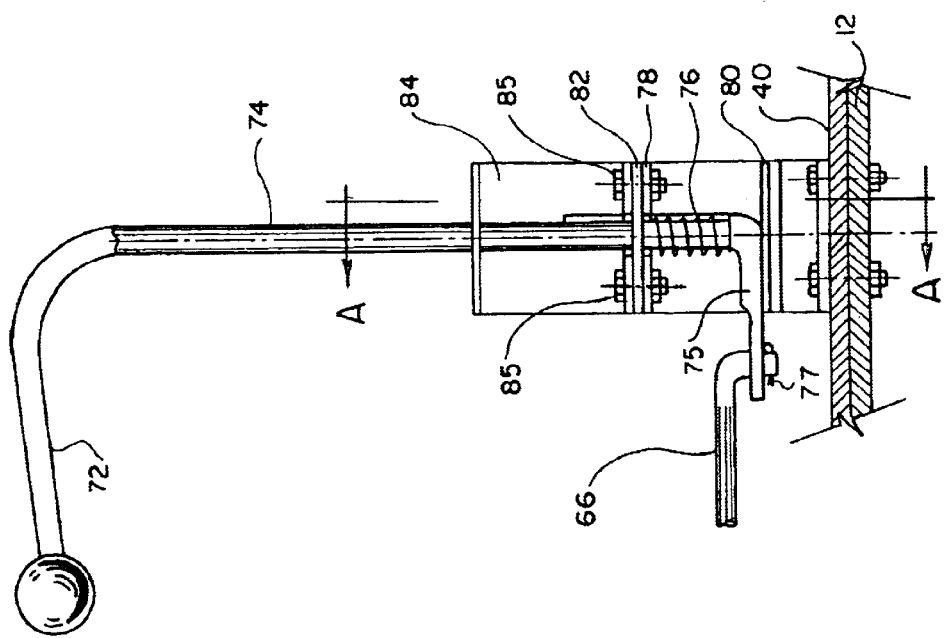

EDGE TRIMMER ASSEMBLY MOUNTABLE ON A LAWN MOWER

FIELD OF THE INVENTION

The present invention generally relates to trimmer devices, and more particularly to an edge trimmer device adapted for attachment to a power lawn mower.

BACKGROUND OF THE INVENTION

Lawnmowers are extensively used by homeowners and commercial services alike. Conventional lawnmowers are generally provided of a walk-behind type and a riding type. When cutting grass, it becomes often desirable to cut the edges of the lawn along the sidewalks, around the trees, shrubs and other structures. This task is usually performed using an edge trimmer that allows the user to get closer to the structures, around, which the grass needs to be cut.

The conventional trimmers are usually of a string type and can be powered by a gasoline engine or by DC electric power. The edge trimmer is a device sold separately and used separately from a lawn mower. A collection of lawnmowers, edge trimmers, leaf blowers and other such yard devices, takes up valuable storage space in a garage or in equipment shed of a homeowner.

Various attempts have been made to combine the lawnmower with an edge trimmer to reduce the number of steps the user performs when trimming vegetation. However, most of these attempts result in expensive, cumbersome machines that take up considerable space in a tool shed or equipment storehouse of a homeowner.

The present invention contemplates elimination of the drawbacks associated with conventional devices for cutting grass and provision of a grass trimmer that is adapted for mounting on a lawnmower, for instance a riding lawnmower to facilitate and expedite the task of cutting grass.

SUMMARY OF THE INVENTION

It is, therefore, an object of the present invention to provide a retractable edge trimmer that can be mounted on a lawnmower without substantial retrofitting of the lawnmower itself.

It is another object of the present invention to provide a trimmer attachment adapted for retrofitting existing power lawnmower of conventional design.

It is a further object of the present invention to provide a trimmer attachment for a lawnmower that allows directing of vegetation cuttings towards the lawnmower for fine mulching by the lawnmower before discharge.

These and other objects of the present invention are achieved through a provision of a trimmer assembly, which is adapted for detachable mounting on a deck of an existing lawn mover. The trimmer assembly has a shroud, or housing, which is secured to a front edge of the mower deck. A mounting frame is secured to the housing for a pivotal movement between an operational position and a non-operational position. A hinge unit is attached between the mounting frame and the shroud facilitating pivotal movement of the mounting frame to an operational position upon demand.

A swivel arm is attached to the mounting frame. A proximate end of the swivel arm is secured to a handle, which is attached in a pivotal relation to the housing. A stop plate limits the pivotal movement of the handle and, in turn, of the swivel arm, allowing to retain the mounting frame in an operation or a non-operational position. The user moves the handle, which extends above the mower deck to a selected position moving the trimmer assembly into an operational or an idle position.

The trimmer assembly further comprises a trimmer head mounted below the mounting frame and secured thereto. The trimmer head carries a plurality of cutting members for cutting vegetation in the desired area. The trimmer head may be powered by a variety of power sources. One embodiment provides for connecting the trimmer head with a power source of the lawn mower. This embodiment has a first pulley "stacked" on top of and operationally connected to one of the lawn mower drive pulleys. A second pulley is mounted on the mounting frame in operational relationship with the trimmer head. A driving belt is stretched between the first pulley and the second pulley for transmitting rotational force from the lawn mower engine to the trimmer head.

When the mounting frame is moved into a general alignment with the first pulley, the belt is stretched between the pulleys for transmittal of the rotational force to the trimmer head. When the user wants to the trimmer head to be idle, the user moves the handle, pivoting the mounting frame into a nonaligned position with the first pulley. The belt is no longer tightly stretched between the pulleys and the rotational force is not transmitted to the trimmer head.

In the alternative embodiments, the trimmer head may be powered by an electric motor or a hydraulic motor mounted on the mounting frame. Of course other power source, such as a re-chargeable battery may be used, depending on the particular design of the trimmer assembly.

BRIEF DESCRIPTION OF THE DRAWINGS

Reference will now be made to the drawings, wherein like parts are designated by like numerals, and wherein

FIG. 6 is a cross-sectional detail view showing a mounting frame swivel arm engaging the handle.

FIG. 7 is a cross-sectional view taken along lines A—A in FIG. 6.

DETAILED DESCRIPTION OF THE PREFERRED EMBODIMENT

Figure 1:
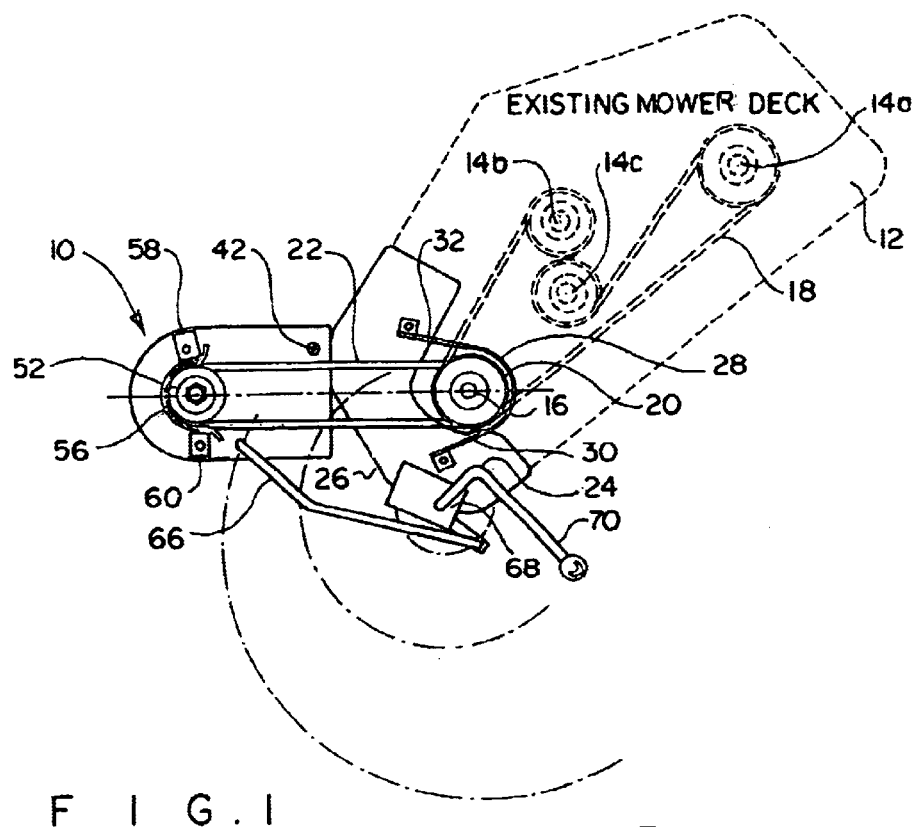
FIG. 1 is a plan view of the trimmer assembly of the present invention mounted on an existing lawnmower deck, with the cutting head in an engaged position.

Turning now to the drawings in more detail, the trimmer assembly of the present invention is generally designated by numeral 10. The trimmer assembly 10 is adapted for mounting to a deck 12 of a conventional lawnmower. A conventional lawn mover has a power means (not shown) that rotates a plurality of driving shafts 14a, 14b, 14c, and 14d for rotating grass cutting blades (not shown) rotating below the deck 12. The present invention utilizes one such driving shafts, in particular the driving shaft 14d (FIG. 3) for securing a pulley shaft 16 of the trimmer assembly 10 thereon.

The shafts 14d and 16 are secured in a co-axial relationship forming a double pulley assembly 20. The driving shafts 14a, 14b, 14c and 14d carry an endless belt 18 of the lawn mover that transmits force between the power driven shafts and the cutting blades. A v-belt 22, which forms a part of the present invention assembly, is wrapped about the pulley shaft 16.

A frame mounting housing or shroud 24 is secured to a front edge of the deck 12. The shroud 24 has an outer edge 26 that generally conforms to the underlying configuration of the deck 12. The shroud 24 is detachably secured to the deck 12 by bolts or other securing means. A double v-belt pulley shield 28 protects the moving belts 18 and 22. The shield 28 is a. U-shaped body having free arms 30, 32 secured to the shroud 24 at 34, 36 respectively.

A mounting frame 40 is pivotally secured to the shroud 24. A hinge unit 42 has an outer sleeve 44 (FIG. 3) and a hinge, or pivot pin 46 extending through the sleeve 44. The pin has a limited rotating movement inside the sleeve 44. The pin 46 allows a limited lateral movement of the mounting frame 40 in relation to the deck 12 and the shroud 24. The mounting frame 40 moves between a belt-engaging position shown in FIG. 1 and a belt disengaging position shown in FIG. 2, as will be explained in more detail hereinafter.

A reinforcing bracket 48 is mounted below the mounting frame 40; the bracket 48 is attached along its vertical edge to the sleeve 44 and along its horizontal top edge—to the underside of the mounting frame 40. The reinforcing bracket 48 provides stability to the cantilevered end of the mounting frame 40 and helps supporting a trimmer head 50.

Secured to a free end of the mounting frame 40 is a trimmer head 50. The trimmer head 50 is operationally connected to a second v-belt pulley 52, which is mounted on a shaft 54 extending through the mounting frame 40. The v-belt 22 is wrapped around the second pulley 52 and moves in an endless loop about the pulleys 16 and 52, when the pulleys are rotated. A second belt pulley shield 56 protects the belt 22 during operation. The second shield 56, similar to the first shield 28 is a generally U-shaped body with two free ends. The free ends of the second shield 56 are secured to the mounting frame 40 at 58 and 60.

The trimmer head 50 carries a plurality of cutting members 62, which can be special flexible strings conventionally used with edge trimmer assemblies. The cutting members 62 are equidistantly disposed about the circumference of the trimmer head 50.

A swivel arm 66 is attached between the mounting frame 40 and a lever bracket 68. The lever bracket 68 is secured above the shroud 24 (FIGS. 3, 6 and 7) and supports a handle 70, which moves the mounting frame 40 between an engaged and a disengaged position. The handle 70 comprises a gripping portion 72, which extends at an angle above the mounting frame 40 and a vertical portion 74, the lowermost part 75 of which bends at a right angle in relation to the vertical portion 74. The portion 75 of the handle 70 has an opening, through which the swivel arm 66 extends. A retaining nut 77 prevents disengagement of the swivel arm 66 from the handle portion 75.

A compression spring 76 is mounted about the lowermost part of the portion 74 above the portion 75. The spring 76 urges against the portion 75 at its lower end and against a bottom lever bracket 78—at its upper end. A U-shaped bracket 82 (FIGS. 6 and 7) extends below the bottom lever bracket 78. The U-shaped bracket 82, at its lower part, supports a stop plate 80. The upper part of the U-shaped bracket 82 is detachably secured, such as by bolts 85, to the bottom lever bracket 78. An upper bracket 84 has a lower portion, which is secured to the lower lever bracket 78 and the U-shaped bracket 82 by the bolts 85. The portion 74 of the handle 70 extends through corresponding aligned openings formed in the brackets 78, 82 and 84.

The portion 75 rests on the stop plate 80, which delimits the movement of the handle 70 in relation to the shroud 24. When the user moves the handle 70 into an engaged position, the stop plate 80 limits the mounting frame 40 from moving beyond the limits of the hinge. The compression spring 76 allows retaining of the handle 70 and the swivel arm 66 in the selected position. When the user moves the handle 70 pushing the swivel arm 66 and the mounting frame 40 into a disengaged position, the stop plate 80 and the spring 76 arrest movement of the handle, allowing the mounting frame to retain in a disengaged position.

When a user wishes to activate rotation of the trimmer assembly 10, the user moves the handle 70 into a position shown in FIG. 1. The handle 70 moves the swivel arm 66, pulling the mounting frame 40 and causing the v-belt 22 to stretch tight between the pulleys 16 and 52. In this position, the rotational force rotating the pulleys 14a, 14b, 14c, and 14d is transmitted to the pulleys 16 and 52, causing the pulleys to rotate and impart the torque on the trimmer head 50. Rotation of the trimmer head 50 causes the cutting members 62 to rotate and cut vegetation on contact.

Figure 2:
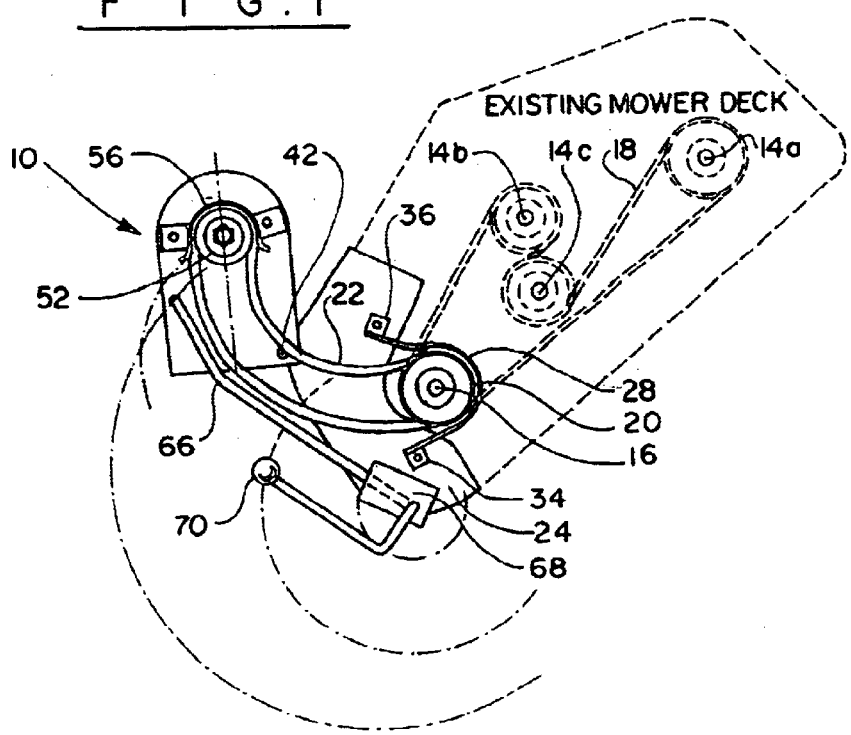
FIG. 2 is a plan view of the trimmer assembly of the present invention mounted on an existing lawnmower deck, with the cutting head in a disengaged position.

After the user finishes trimming of the desired vegetation, the trimmer assembly 10 may be disengaged. In this position, which is illustrated in FIG. 2, the user moves the handle 70, pushing the swivel arm 66 and forcing the mounting frame 40 to pivot about the pin 46. The mounting frame 40 causes the distance between the pulleys 16 and 52 to decrease, which in turn causes the belt 22 to relax such that rotation of the pulley 16 no longer causes rotation of the trimmer head 50. In this disengaged position, the cutting members 62 are not operational.

Figure 4:
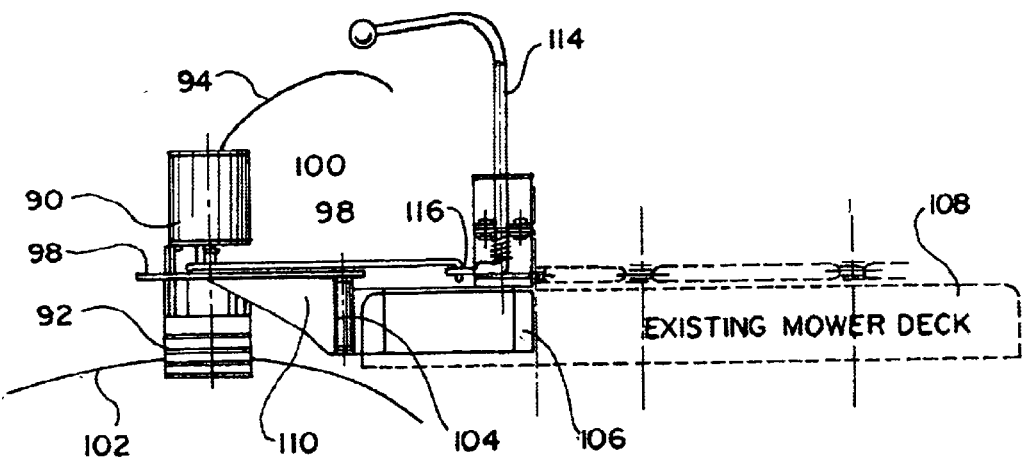
FIG. 4 is a front elevational view of the trimmer assembly of the present invention powered by an electric motor drive.

FIG. 4 illustrates an alternative embodiment of the present invention, which provides for the trimmer assembly to operate independently from the lawn mower cutting blades. In this embodiment, an electrical motor 90 is mounted above the trimmer head 92. An electrical cord 94 connects the motor 90 to a source of DC power. In this embodiment, the trimmer head 92 extends below he mounting frame 96, which carries a swivel arm 98. A trimmer pulley 100 is operationally connected to the motor 90 and the trimmer head 96. A plurality of cutting members 102 is secured on the trimmer head 92 for cutting vegetation.

Figure 3:
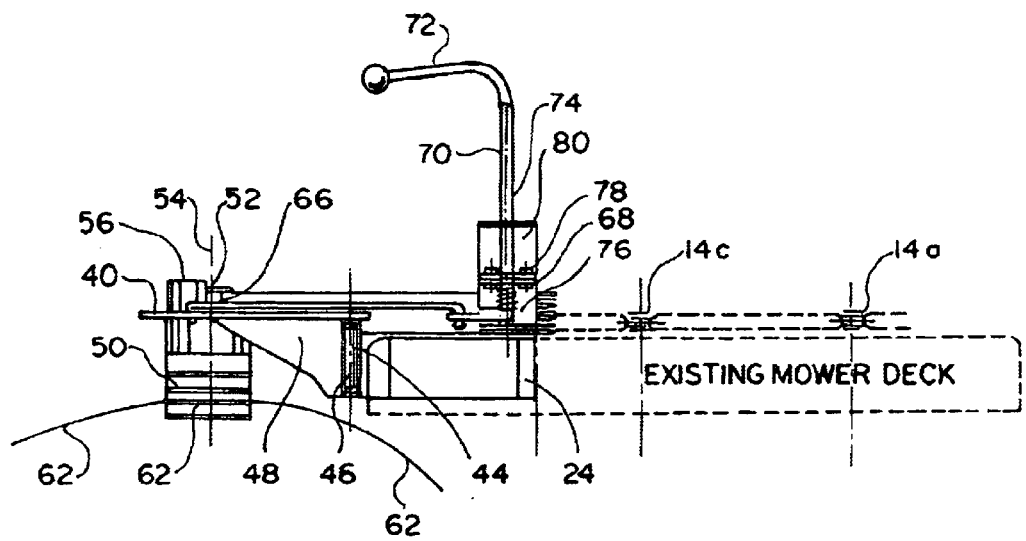
FIG. 3 is a front elevational view of the trimmer assembly in accordance with the present invention mounted on the existing lawnmower deck and powered by a V-belt drive.

Similarly to the embodiment shown in FIGS. 1–3, a hinge assembly 104 is secured between the mounting frame 96 and a housing, or shroud 106. The shroud 106, in turn, is adapted for detachably securing on an existing lawn mower deck 108. A supporting bracket 110 extends below the mounting frame 96 to support the cantilever extension of the distant end of the mounting frame 96 and provide stability for the trimmer head 92 and the motor 90.

This embodiment of the present invention does not require a second pulley, similar to pulley 16, for operating the trimmer head 92. Still the movement of the mounting frame 96 between an engaged and a disengaged non-operational position is accomplished in the same manner. A handle 114 having a lower part connected to the swivel arm 98, pushes against resistance of a compression spring 116, causing the swivel arm 98 to move about the mounting frame 96 about the hinge assembly 104. The user selectively rotates the handle 114 to move the trimmer head 92 into a desired position for operation.

Figure 5:
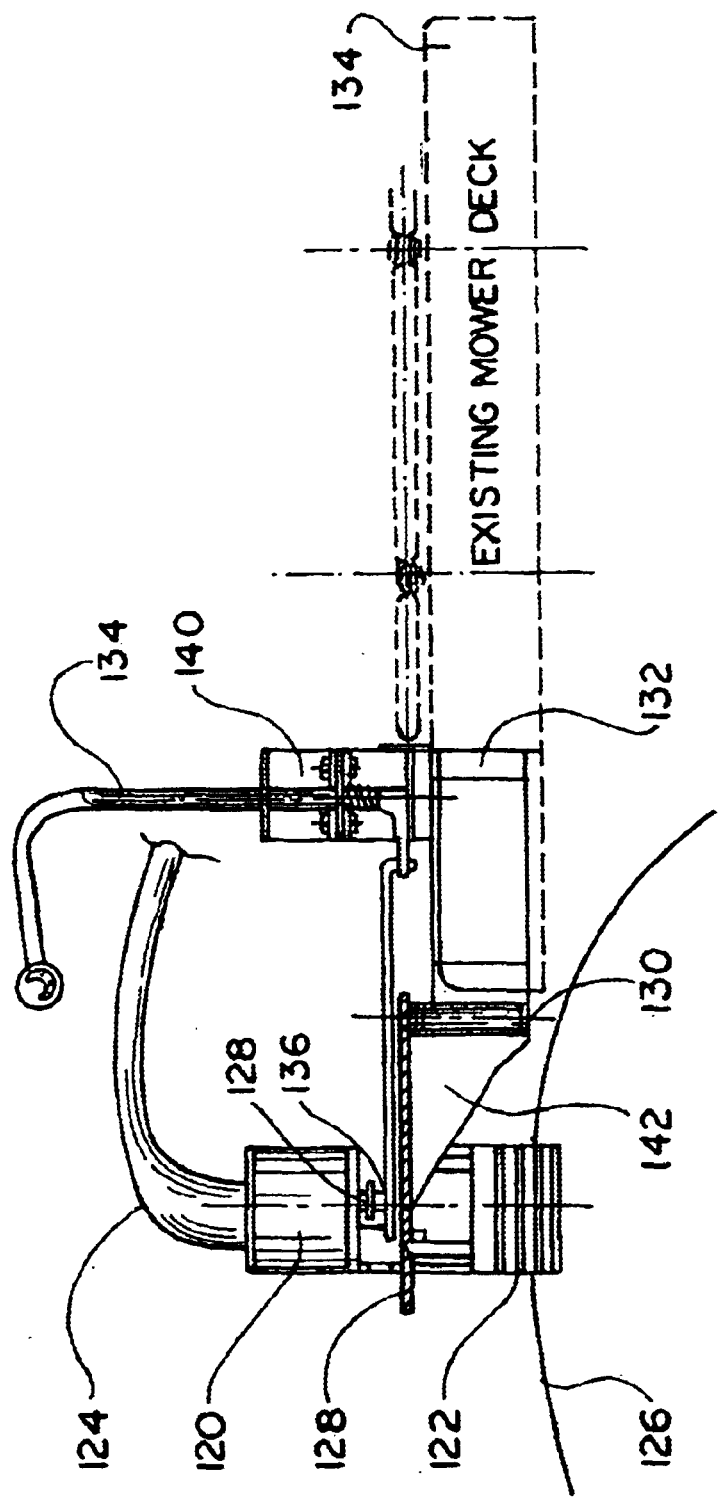
FIG. 5 is a front elevational view of the trimmer attachment of the present invention powered by a hydraulic motor drive.

FIG. 5 illustrates still another embodiment of the present invention, which is designed to use a hydraulic motor for operation of the trimmer head. This embodiment is similar in many respects to the embodiment illustrated in FIG. 4 except that a hydraulic motor 120 is mounted in operational relationship to a trimmer head 122. Hydraulic hoses 124 connect the motor 120 to a source of power. Similar to the embodiment of FIG. 4, the trimmer head 122 carries a plurality of cutting elements 126 for cutting vegetation. A trimmer assembly pulley 128 is mounted between the motor 120 and the trimmer head 122. A mounting frame 128 carries the trimmer head at a distant end thereof. A hinge assembly 130 secures the proximate end of the mounting frame 128 to a mounting housing or shroud 132, which is adapted for detachable engagement with a deck 134 of an existing lawn mower.

A handle 134 is connected to a swivel arm 136. The swivel arm is secured to the mounting frame 128. A compression spring 138 is mounted about a lower portion of the handle 134 and acts, in cooperation with a stop mounted on the bracket 140 to limit pivotal movement of the mounting frame 128 in relation to the shroud 132. A supporting bracket 142 supports the mounting frame 128 on the underside. The operation of the trimmer assembly of this embodiment is similar to the operation of the embodiment illustrated in FIG. 4.

The trimmer assembly of the present invention is mounted forward of the cutting blades carried by the existing lawn mower. As a result, the cuttings generated by the cutting elements of the trimmer head are moved by air current to the back of the trimmer assembly, in the path of the lawn mower cutting blades. If the lawn mower blades are rotating, the cuttings are then further chopped into smaller pieces and may be discharged through a side of the lawn mower similar to the cuttings generated by the lawn mover per se.

The trimmer assembly of the present invention is easily positioned and easily detached from a conventional lawn mower. The conventional law mowers may be inexpensively and relatively easy retrofitted with the trimmer assembly of the present invention. Since the trimmer assembly is mountable on the existing structure it does not require as much space for storage as conventional edge trimmers.

The present invention provides for different drive options: a belt drive connected to the lawn mower power source; an electric motor and a hydraulic motor. It is envisioned that other power drive options, such as for instance a re-chargeable battery, will become apparent to those skilled in the art.

Many other changes and modifications may be made in the design of the present invention without departing from the spirit thereof. I, therefore, pray that my rights to the present invention be limited only by the scope of the appended claims.

I claim:

1. A trimmer assembly mountable on a lawn mower having a mower deck and a front edge, the trimmer assembly comprising:
    a trimmer head;
        a mounting frame supporting the trimmer head forward of the front edge of the lawn mower;
        a housing adapted for detachable mounting on the front edge of the mower and pivotally connected to said mounting frame;
        a means for pivotally connecting the mounting frame to the front edge to facilitate movement of the trimmer head between an operational position and a non-operational position in relation to the mower deck, said means for pivotally connecting the mounting frame comprising a hinge unit mounted between the housing and the mounting frame, a swivel arm extending between the mounting frame and the housing, and a handle operationally connected to the swivel arm for pivotally moving the mounting frame in relation to the mower deck upon demand, wherein said means for pivotally moving the mounting frame further comprises a means for limiting rotational movement of the handle; and
    a means carried by the mounting frame for transmitting rotational force to the trimmer head.

2. The trimmer assembly of claim 1, wherein said means for limiting rotational movement of the handle comprises a stop plate mounted below a handle and a compression spring engaging a lower portion of the handle, said compression spring urging, at its upper end, against a lever bracket mounted above the housing.

3. A trimmer assembly mountable on a lawn mower having a mower deck and a front edge, the trimmer assembly comprising:
    a trimmer head;
        a mounting frame supporting the trimmer head forward of the front edge of the lawn mower;
        a housing adapted for detachable engagement with the front edge of the mower deck;
    a means for pivotally connecting the mounting frame to the housing to facilitate movement of the trimmer head between an operational position and a non-operational position in relation to the mower deck, said means comprising a hinge unit mounted between the housing and the mounting frame, a swivel arm extending between the mounting frame and the housing, and a handle secured to the housing and operationally connected to the swivel arm for pivotally moving the mounting frame in relation to the mower deck upon demand;
        a means carried by the mounting frame for transmitting rotational force to the trimmer head, said force transmitting means comprising a belt secured for movement between a first pulley mounted on and drivingly connected to a drive pulley of the lawn mower and a second pulley mounted on the mounting frame, the second pulley transmitting the rotational force from the drive pulley of the lawn mower to the trimmer head; and
        a means for limiting rotational movement of the handle, said means comprising a stop plate mounted below a handle and a compression spring engaging a lower portion of the handle, said compression spring urging, at its upper end, against a lever bracket mounted above the housing.

4. A trimmer assembly mountable on a lawn mower having a mower deck and a front edge, the trimmer assembly comprising:
    a trimmer head;
    a mounting frame supporting the trimmer head forward of the front edge of the lawn mower;
    a means for pivotally connecting the mounting frame to the front edge to facilitate movement of the trimmer head between an operational position and a non-operational position in relation to the mower deck, and wherein said means for pivotally moving the mounting frame further comprises a means for limiting rotational movement of the handle; and a means carried by the mounting frame for transmitting rotational force to the trimmer head, said force transmitting means comprising a power source mounted on said frame above the trimmer head and operationally connected to the trimmer head.

5. The trimmer assembly of claim 4, wherein said means for limiting rotational movement of the handle comprises a stop plate mounted below a handle and a compression spring engaging a lower portion of the handle, said compression spring urging, at its upper end, against a lever bracket mounted above the housing.

* * * * *